(12) United States Patent
Richards

(10) Patent No.: X5272
(45) Date of Patent: Nov. 14, 1828

(54) WINDOW SASH, & C.

(76) Inventor: Jedediah Richards Jr.

Jedediah Richards [illegible]

Letters Patent

[illegible] Schedule referred to in these Letters Patent and making part of the same containing a description in the words of the said [illegible] of his new improvement [illegible] machine for making [illegible] and window blinds, doors, [illegible] all kinds of cabinet work, [illegible] frames and all kinds of small carpenter work.

[illegible] machine [illegible]. I have a frame with [illegible] two feet ten inches high [illegible] from the floor [illegible] to the posts with iron screw bolts. The machine is ten feet long and one foot wide with two rails and two beams that [illegible] [illegible]. I have two middle timbers to support the upper work. On the girts I have a drum two feet diameter. On the left of the machine [illegible] I have two saws that stand horizontal. Two saws are on one shaft that stand perpendicular [illegible] apart as the stuff is wanted to be thick with a block between them. These saws [illegible] the stuff to any thickness required for the work by putting between the saws different blocks; these saws run on a post that stands back of the saws. At the bottom of the saw shaft I have a [illegible] fastened to the post with a screw so that the saws can be raised and lowered as may require. Below the saws on the saw shaft I have a wheel that the belt goes round to drive the saws. The belt passes over two wheels that are twelve inches in diameter. These wheels [illegible] a frame that slides back and forward to tighten and loosen the band. These wheels turn the belts from a perpendicular to a horizontal manner. This belt passes from these wheels to the main drum. I have two saws that stand perpendicular beyond the horizontal saws. These saws cut off the stuff from the piece. These saws are driven by a belt that passes down the accelerating wheel that hangs on a swing frame and from the drum to this wheel I have a belt & when the swing is brought back by a treadle it tightens the lower band
and gives motion to the saw to hold the stuff to be slit off. I have a car
riage with two head blocks that are let out & taken up to the length
of the piece to be sawed by means of a rod that is fastened under the
head blocks by a screw at each end to take up the head blocks
& let them out as they may require. The head blocks are made of
iron 16 inches long & ten inches wide & one half inch thick. The [illegible]
[illegible] block the perpendicular saw frame thro' there is a piece in the
head block four inches wide rising higher than the screw that connects
the two parts of the head block. on the right hand head block I have
a slide, on the [illegible] of the slide I have a handle that is formed [illegible]
hand [illegible] the [illegible] that holds the piece when sawing. when the piece
is sawed [illegible] the handle it is loosened on the inner edge of the
head blocks. I have a groove to [illegible] on the floor at each end the
head blocks run on ribbons; these ribbons lie on the top timber
of the frame. The second machine is for planing. it is
eleven feet [illegible], two feet six inches wide. the posts three feet ten inches
high. there are ten posts, four long posts and three short [illegible]
that are [illegible] all [illegible] with iron bolts. there are two beams the
[illegible] two feet four inches from the bottom. The wheel [illegible] the
main beam is two feet diameter with an iron crank
& shaft. The crank is in the form of a "T" with two square notches
at the ends of the "T" for the slide to pass thro'. The slide is held in
the crank at any given length by two screws. the [illegible] is hung
on the two left hand posts on an arbour at the end of the slide -
the [illegible] is attached to a slide that [illegible] the back part of the
machine. this slide is attached to a beam with a tongue & groove
that holds the slide steady. this slide is horizontal with the crank
I have two [illegible] shafts of iron at the ends of the slide. the slide
runs on these shafts with two wheels on each shaft one eight inches
and the other four inches. there are belts connected to these & attached
to the [illegible] [illegible] & a [illegible] belt to tighten the belts on the
lower wheels. there are belts fastened that next to the frame [illegible] -

The frame jack is made of three pieces of wood, the upright pieces
are seven inches long. the horizontal piece is ten inches long. the two
upright pieces have a groove out in the ends to fit ways where they run
they are lined with metal to prevent their wear. this jack runs
between the ways. the ways are attached to a beam. this beam is screw
ed to a sword at each end. that passes down thro the bed pieces. at
each end of the way beam there is an iron bolt twenty inches long
with a screw & nut at the bottom. the nut is fastened to the bed. the
bolt has a collar that is attached to the way beam. there is a handle
on the top of the bolt when the bolt is turned. it lowers and raises
the frame. the ways are fastened to four upright pieces. these pieces
[illegible] into the way beam. on the bottom of these pieces one of the ways
is fastened. the upper way is fastened to the top of these pieces with
screws. so that it can be let down on the [illegible] to tighten it on
the bottom of the jack. the sticking tool and plane are fastened
with two screws on the bed pieces. I have a carriage five feet long &
two feet wide to lay the stuff on to be planed. it is moved back and
forward [illegible] rack and pinion on each end of a shaft. the shaft
is as long as the carriage & lies under the carriage with a cog wheel
at the right hand on the pinion shaft twelve inches diameter.
this cog wheel is worked by a [illegible] that is attached to the crank
[illegible] by the crank and pitman moving the [illegible]. the two shafts
[illegible] which gives the frame motion.

The third machine is for [illegible] and tenoning. this machine
is a frame with four posts two feet ten inches long with four sills
ten inches from the bottom of the posts screwed with iron bolts
on these girts. I have a drum two feet diameter that carries
the saws on the top of the posts. I have two plates seven feet long
and two beams five feet long between the beams. I have four
cross timbers to [illegible] the [illegible] [illegible] tenoning. I have a frame three
feet long. one foot eight inches wide. twelve inches high. this frame
[illegible] hold the timber on to tenon. I have a post five feet [illegible]
ed to the frame. the end of the top frame is connected with this post. on this post I have two pieces of iron twelve inches long
with the ends turned out to receive a screw that goes thro' the
posts' heads. these posts' heads hold the shouldering saws. these
irons have a mortice in the middle and a bolt that passes through
the post. a screw nut on the outside of the post. by these means
the saws are raised and lowered. moved back and forward. the
piece to be mortised passes between these saws. first the saws have
one over the other eight or ten inches beyond these saws I have
two horizontal saws on one shaft that slits the tenon as far apart
as the tenon is thick. the shaft at the bottom stands on a [illegible]
[illegible] fixed by a slide and groove that it be moved off and on
to [illegible] with the shouldering saws. the upper end of this shaft
is [illegible] with a [illegible] that stands on a [illegible] post. this [illegible]
a mortice and a screw bolt that these saws can be moved back
and forward & fastened to any place. these saws are [illegible] by a band
from the main drum that passes over two wheels and turns the
band from a perpendicular to a horizontal course. these wheels
are twelve inches diameter. they ~~may~~ hang on a frame that slides
back and forward to tighten and loosen the band. the band is con-
nected to the same shaft below the saws - the shouldering saws are
driven by a shaft placed under the platform when the stuff is [illegible]
end. a wheel [illegible] beyond the saw shafts. this wheel is six in-
ches diameter with two belts to carry the saws at the other end of
the shaft I have a wheel four inches diameter. a band leading from
this wheel to the main drum. the shaft at this end is raised
& lowered to stop the saws. The saw that is for slitting is on the
right hand side of the frame is put in motion by an accelerating
wheel. this wheel hangs on a [illegible] that is moved backwards and
forwards by a treadle which tightens and loosens a band connect-
ed with this wheel & the main drum which stops the saw or giving it
motion the object of this [illegible] is to stop the saw and give it mo-
tion. The fourth machine is for mortising. this machine
has two posts. [illegible] near the top there is a [illegible] three [illegible] four inches long

[illegible] inches below this upper girt is another girt the same length +
size those girts are fastened to the posts by tenons and screw bolts these
girts hold two fender posts. these hold the chisel gate on the inside of
the posts there are two iron ways that that are round fastened at
each end with eyes that go through the posts. the gate is made with
three pieces of timber one standing perpendicular and two horizontal at each
end of the horizontal pieces is a hollow groove that fits on these round ways,
these horizontal pieces are eight inches long three inches wide & two inches
thick. the middle piece is three inches wide two inches thick and
six inches long. they are fastened with two iron bolts with eyes at the
bottom where the pitman is hung these bolts pass through the
middle piece of the gate on the top of the gate there are two screw
nuts at the upper end of the bolts on the bottom piece of this gate.
I have an iron plate fourteen inches long one inch and a half wide
and three eighths of an inch thick bolted to the bottom piece
this plate the chisel stocks are bolted on these blocks are one inch
long [illegible] a projection at one end of one inch a square [illegible] on
this projection that the chisels pass through with two screws on each
chisel block that are screwed against the chisel on the back
side of this block there are two projections that are to go on each side
of the plate to keep the blocks steady In the thin part of the chisel
block I have a mortice and a screw bolt that enters the plate so that
these blocks can be moved backwards and forward to make any size
work. In the block I have the double chisels for mortising the main
work. behind the plate I have two single chisels that mortice the
[illegible] of the stiles. the bed piece that the stuff lies on to mortice is a piece
of timber five inches square, five feet long it stands on two screws that
the bed piece may be lowered and raised to suit any thickness of stuff
this bed piece lies in front of the posts. this bed piece has moving
steps that will move to mortice any length of stuff required. the piece
is held between them all the stuff is worked from the end between
the end steps. I have middle steps when the piece is moved
from one step to another by [illegible] against the middle step
with piece to be mortised it moves back out of the way. it is brought forward
by a spring. the stiles are laid across the bed piece to mortise by this
bed piece till the mortises are made in the piece in one [illegible] handling
back of the bed piece are stops to gauge the ends of the stiles from
the gate downward I have the pitman. it is attached to a crank
below with six inches sweep. the crank wheel is ten inches diam
eter & hangs on a frame within six inches of the floor. the frame the
[illegible] in journals it is put in motion from the main drum it is
stopped and put in motion by a treadle with the foot.
The fifth machine is for tenoning rough stuff & making pins.
For this machine I have four posts two feet ten inches high four
feet ten inches from the bottom on those posts I have a frame two
feet [illegible]. on the top of the posts I have two plates six feet long
across the frame I have two beams five feet long between these beams
I have five [illegible] timbers to hang the work to on the right side of
the frame I have a rough stuffing saw on the back end of the
frame I have a saw for cutting timber to the length this saw is
stopped and set in motion by a swing [illegible] which I
is managed by the foot & a treadle to cut the stuff to any given
length. I have a slide with a stop at one end this slide is
fastened with a screw. I have a block to hold the stuff against
that is square with the saw that moves over the saw with a [illegible]
in the block for the saw to pass thro this block the straight
side of the stuff is held against this block is guided by two pieces
running from to the under side running each side of timber fit
[illegible] to the top timbers of the frame
The pin machine is made with three pieces of timber three by five
inches the two posts twenty inches long. the top piece sixteen inches long
on the insides of the posts I have a groove the gate runs in that [illegible]
[illegible] the drive that drives the pin from the gate I have a pitman
that is attached to a crank six inches sweep on the crank
shaft I have a wheel twenty inches diameter that drives & will
[illegible] set the machine in motion when the pin is made I have a die made the size of the pin over this die I have a gauge
plate that holds the pin before it is cut above the gauge plate
I have an iron box that the pin falls in when the pin is in
this box there is a slide that shoves the pin & holds it until the [illegible]
[illegible] strikes it the driver is square and just fits the gauge plate
when the driver is down the pin falls thro' a hopper by the side of
the driver. The improvements different from [illegible] are
as follows. The first machine is all my invention or im
provement. The planing machines differ from this in the
frame the frame is longer [illegible] wheel is hung on the left
end of the frame by having two [illegible] shafts the [illegible]
[illegible] with ~~with~~ the centre of the [illegible] the [illegible]
[illegible] the manner the [illegible] are fixed to carry the plane and the [illegible]
[illegible] when the plane is hung [illegible] and [illegible] the
frame. Machine No. 2 is different it [illegible] in the frame
and chisel [illegible] the chisel [illegible] and [illegible] the [illegible]
[illegible] made [illegible] that any piece of timber is [illegible] before
it is [illegible] without [illegible] but once.

Machine No. 3 is different in the tenoning part. The [illegible]
[illegible] first made then the [illegible] to [illegible] to the [illegible]
[illegible] where the piece is finished. the [illegible] are carried
by a band [illegible] the [illegible] that [illegible] two wheels
from a perpendicular to a horizontal manner all the others [illegible]
except those that [illegible] the [illegible] of the tenons are put in
motion & stopped by a [illegible] & [illegible]. The pin machine
No 3 is my improvement Witnesses
J A Elliot
Wm Leyland Jedediah Richards Jun
(Seal)

(3094 words) ((Drawing in Port-folio)

Ex. [illegible]